June 7, 1927.
A. BENNETT
1,631,459
SHOCK ABSORBER
Filed Sept. 22. 1925
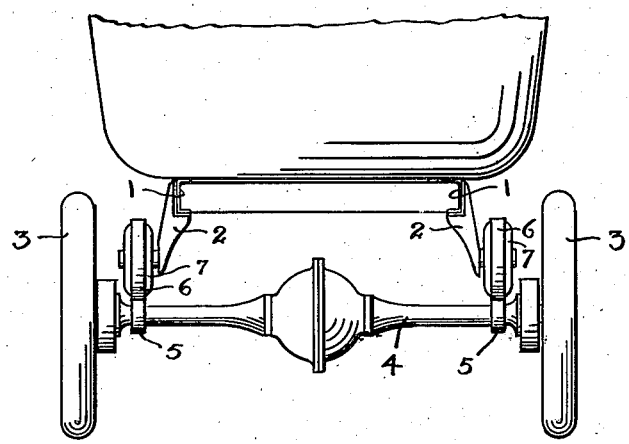
Fig. 1.
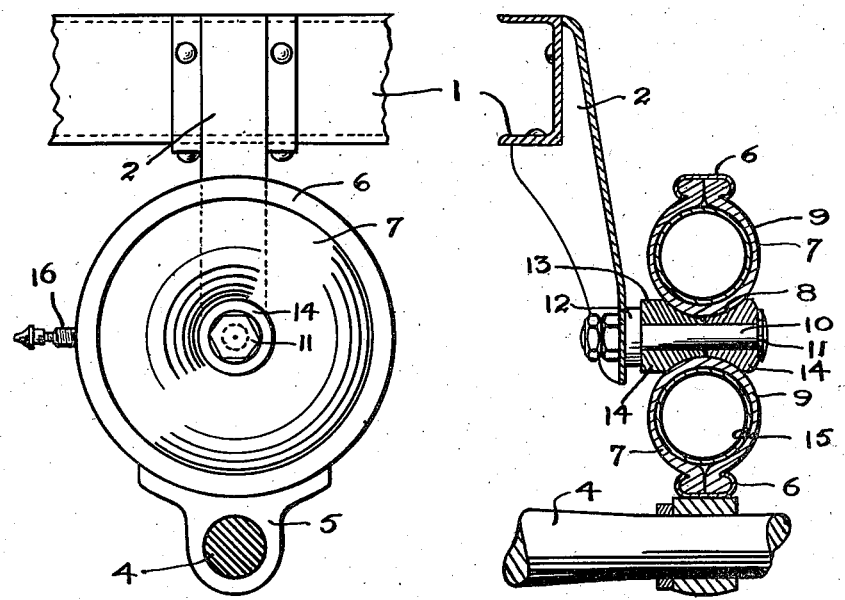
Fig. 2.
Fig. 3.
INVENTOR
ARTHUR BENNETT
BY Featherstonhaugh & Co
ATTORNEYS Patented June 7, 1927.

1,631,459

UNITED STATES PATENT OFFICE.

ARTHUR BENNETT, OF CHILLIWACK TOWNSHIP, BRITISH COLUMBIA, CANADA.

SHOCK ABSORBER.

Application filed September 22, 1925. Serial No. 57,938.

My invention relates to improvements in shock absorbers the objects of which are to provide means whereby the effect of road shocks may be absorbed between the axle of the road wheels of a vehicle and its frame. A further object is to utilize pneumatic means both for cushioning the initial shock and for countering the rebound therefrom.

The invention consists essentially of brackets extending from a vehicle frame to each of which is secured a pneumatic tire enclosed within a rim supported upon the axle of the road wheels, as will be more fully described in the following specification, in which:—

Fig. 1 is a rear view of a car showing the invention.

Fig. 2 is an enlarged side view of the invention.

Fig. 3 is a transverse sectional view.

In the drawings like characters of reference indicate corresponding parts in each figure.

The frame members of the vehicle are indicated by the numeral 1, and to these brackets 2 are secured in a position directly above the axles. The numeral 3 indicates a pair of road wheels suitably mounted upon an axle carried within an axle housing 4, adjacent each end of the axle housing a bearing 5 is provided which forms a support for a tire rim 6, of any suitable type such as for a straight wall or a clincher tire.

The numeral 7 indicates a tire, preferably pneumatic, which is formed in the reverse manner to that employed in tire manufacture generally, in so far as the holding rim is disposed at the outer periphery of the tire, and the tread 8 is on the inner periphery, the tread of the tire, being relieved of rubbing wear may be made relatively thin and be capable of affording the same degree of resilience as the side walls 9, thereby permitting great deflection without causing undue heat generation.

The numeral 10 indicates a pin having a nut 11 at one end and a shoulder 12 adjacent the opposite end, this pin is secured to the lower end of the bracket 2 and is fitted with a removable rubber bushing 13, comprising two substantially conical members 14, so that in the event of it being desired to remove the tire 7 from the rim 6, the nut 11 may be removed and the outer member withdrawn to facilitate the handling of the tire. The numeral 15 indicates an inner tube which is fitted in the ordinary manner with a valve 16 for the admission of air to the tube.

Having thus described the several parts of my invention I will now explain its function.

The road shocks transmitted to the rim 6 from the road wheels are cushioned on the lower side of the pin 10 by the rubber bushing 13 and the lower half of the tire 7, the resilience of the rubber in the tread and side walls of the lower part of the tire supported by the internal air pressure permitting the tread to remain in constant engagement with the bushing.

What I claim as my invention is:

1. A shock absorber comprising a tire detachably carried in a rim and having a tread upon its inner periphery, means for supporting the rim upon a wheel axle, and means for supporting a vehicle frame upon the tire tread, said supporting means characterized by a pin having a two member bushing adapted to engage the tread of the tire.

2. A shock absorber comprising a tire detachably carried in a rim and having a tread upon its inner periphery, means for supporting the rim upon a wheel axle, and means for supporting a vehicle frame upon the tire tread, said supporting means characterized by a pin having a two member bushing detachably secured thereto and adapted to engage the tread of the tire.

Dated at Chilliwack BC this 2nd day of September 1925.

ARTHUR BENNETT.